United States Patent [19]

Stahlecker

[11] Patent Number: 5,715,652
[45] Date of Patent: Feb. 10, 1998

[54] APPARATUS FOR PRODUCING AND APPLYING A PROTECTIVE COVERING TO A CUT EDGE OF AN OPENING OF A CONTAINER WALL

[75] Inventor: Werner Stahlecker, Stuttgart, Germany

[73] Assignee: Ruediger Haaga GmbH, Germany

[21] Appl. No.: 545,180

[22] Filed: Oct. 19, 1995

[30] Foreign Application Priority Data

Nov. 18, 1994 [DE] Germany ............... 44 41 097.2

[51] Int. Cl.⁶ ............................................. B21D 39/00
[52] U.S. Cl. .......................... 29/512; 29/243.517; 53/296
[58] Field of Search .................. 29/512, 243.517;
72/336, 335, 338, 339; 53/410, 416, 423,
412, 290, 296; 156/223, 293, 69; 493/87;
413/22, 53

[56] References Cited

U.S. PATENT DOCUMENTS

| | | | |
|---|---|---|---|
| 3,307,737 | 3/1967 | Harvey et al. | 72/264 |
| 3,777,966 | 12/1973 | Green | 29/512 |
| 3,785,029 | 1/1974 | McClellan et al. | 29/512 |
| 3,882,264 | 5/1975 | Travis | 29/512 |
| 4,397,401 | 8/1983 | Ueno et al. | |
| 4,479,287 | 10/1984 | Asaka | 29/512 |
| 4,526,287 | 7/1985 | Miyamatsu et al. | |
| 4,650,532 | 3/1987 | Kloehn et al. | 29/512 |
| 4,765,177 | 8/1988 | Pendleton et al. | 29/512 |
| 4,781,012 | 11/1988 | Reil et al. | 53/452 |
| 4,782,646 | 11/1988 | Nantin | 53/412 |
| 4,909,434 | 3/1990 | Jones et al. | 493/87 |
| 5,158,633 | 10/1992 | Rausing | 53/296 |
| 5,297,375 | 3/1994 | Reil et al. | 53/420 |
| 5,308,418 | 5/1994 | Bjorck | 156/69 |

FOREIGN PATENT DOCUMENTS 0 200 877 A2  11/1986  European Pat. Off. .
253 764  11/1948  Switzerland .

Primary Examiner—Lowell A. Larson
Assistant Examiner—Ed Tolan
Attorney, Agent, or Firm—Evenson, McKeown, Edwards & Lenahan, P.L.L.C.

[57] ABSTRACT

For an opening for a container wall, a rivet-shaped protective covering is made and applied by an apparatus. A sheet-like piece of foil is laid down by an applying device on a first wall area bordering the opening. The section overlapping the opening is formed into the opening by a first forming device. A part of the section projects out of the opening at a second wall area bordering the opening. The part of the foil piece projecting out of the opening is formed against the second wall area by a second forming device, whereby the rivet-shaped form of the foil piece is maintained. The rivet-shaped protective covering is affixed permanently to the container wall by an affixing device.

21 Claims, 7 Drawing Sheets

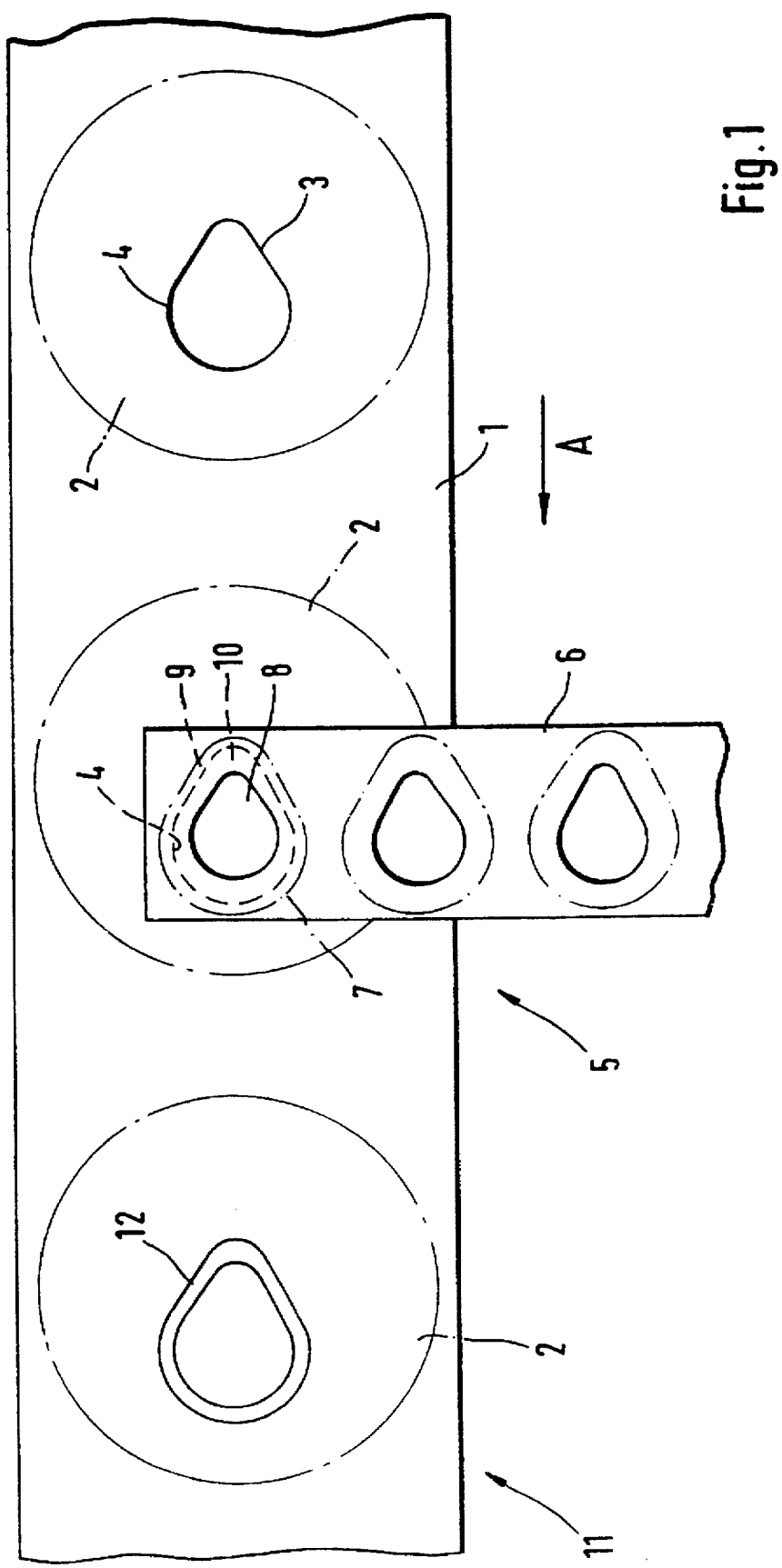

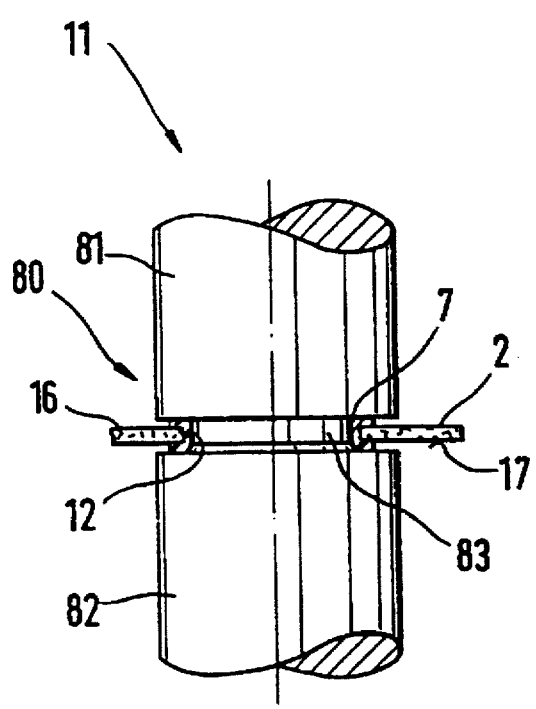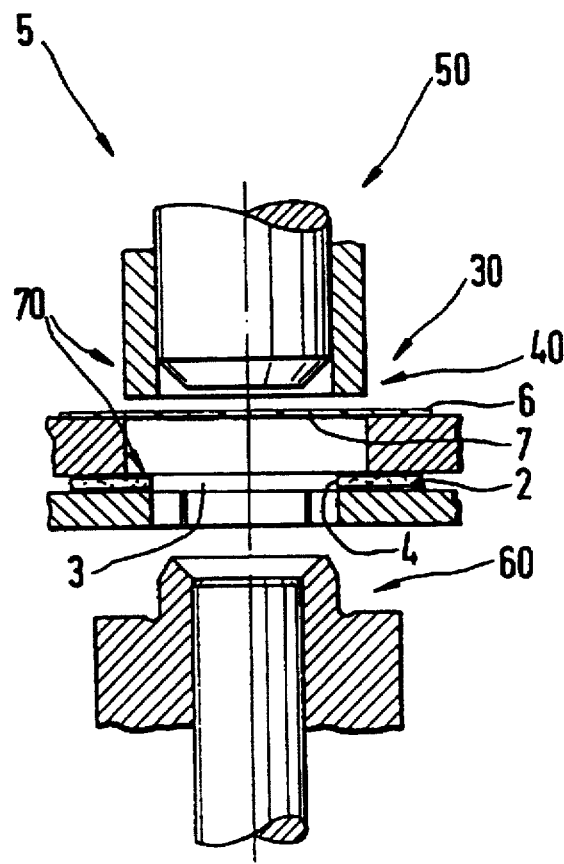
Fig. 3
Fig. 3A

APPARATUS FOR PRODUCING AND APPLYING A PROTECTIVE COVERING TO A CUT EDGE OF AN OPENING OF A CONTAINER WALL

CROSS-REFERENCE TO RELATED APPLICATIONS

This application is related to application Ser. No. 08/545,094 filed on Oct. 19, 1995 in the name of Werner STAHLECKER for CONTAINER COMPRISING A CONTAINER BODY PART AND A FRONT WALL CONNECTED THERETO.

BACKGROUND AND SUMMARY OF THE INVENTION

The present invention relates to an apparatus for producing and applying a protective covering for a wall opening of a container, whereby the edge of the opening and both edge areas of the two wall areas of the wall bordering the edge are covered in a rivet-like manner by the protective covering.

U.S. Pat. No. 4,397,401 describes a rivet-shaped protective covering made from two sheet-like pieces of foil. The two pieces of foil are fed to the container wall containing the opening. One foil piece is applied to one wall area bordering the edge of the opening, and the other foil piece is applied to the other wall area bordering the edge. Thereby, the opening of the wall is completely covered by each foil piece. Covering of the edge of the opening takes place in that one foil piece or both foil pieces are formed into the opening. Both foil pieces are melted together in the edge area to produce a uniform protective covering. An opening is made in both foil pieces whose diameter is somewhat smaller than the diameter of the original opening of the container wall comprising the uncovered cut edge.

Unpublished German patent application Serial No. P 44 11 925.9 describes a rivet-shaped protective covering for an opening of a container wall which is made from only one foil piece. In one embodiment, a sheet-like foil piece is applied to a first wall area so that the opening and the edge area of the wall bordering the opening are covered. The section of the foil piece covering the opening of the wall can be provided with an opening whose diameter is smaller than that of the wall opening. The section of the foil piece covering the wall opening is formed into the opening such that a tube-shaped section of the foil piece is formed and projects slightly out of the wall opening at the second wall area. This section of the foil piece projecting out of the opening is formed towards the second wall area so that the rivet-shaped form of the foil piece is maintained. The foil piece is attached permanently to the wall and thus forms a rivet-like protective covering.

It is an object of the present invention to provide an apparatus for making a rivet-shaped protective covering comprising only one foil piece, and which can be applied to a wall opening in a container.

The foregoing object has been achieved in accordance with the present invention by an apparatus which comprises a device for applying a sheet-like foil piece to the first wall area, a device for forming a section of the applied foil piece overlapping the wall opening in through same, a device for forming a section of the formed foil piece which projects out of the wall opening at the second wall area, and a device for permanently attaching the foil piece formed into a rivet-shaped protective covering.

The device of the present invention advantageously enables a simple and reliable manufacturing and application of a rivet-shaped protective covering.

The present invention can be applied to all container walls where a substance, in particular the container contents, must be prevented from leaking into the container wall. In the opening area, the wall surface is often broken open, in particular when the opening is made by cutting or punching. By applying the protective covering, a similar or identical protection, as found in other areas of the container, can be made in the edge area.

It is not important in which of a plurality of container walls the opening is present or whether the container consists of a plurality of walls.

The wall comprising the protective covering at the opening can be made into a container of varying forms and, for example, be fed to a container-producing machine.

"Foil" as used herein means all sheet material which is formable, whereby the thickness of the material is irrelevant. Insofar as no heat is used for the forming device, it is sufficient for the foil to be formed cold.

The wall to which the protective covering is to be applied can be already provided with an opening when it is fed to the apparatus. It is also possible to provide the apparatus with a device for making the opening in the wall.

A foil piece without broken-through areas for openings can be used for making the protective covering. It is, however, also possible to use a foil piece with an opening. A foil piece in which there is an opening can then be fed to the apparatus. It is also within the scope of the present invention to arrange a device to the apparatus with which an opening can be made in the foil piece. The making of the opening can take place before, during or after the forming of the foil piece. The presence of an opening in the foil piece intended for forming can be useful when only mechanical forming devices are used.

The foil piece can be affixed in one or several production stages. It is, for example, possible to permanently affix the foil piece to the first wall area simultaneously during application, to then form the foil piece and finally to affix the formed section of the foil piece to the second wall area of the wall. It is also possible instead to affix the foil piece to the wall areas and if required in addition, to the edge of the opening, after it has been formed.

In one advantageous embodiment, the apparatus is provided with a device for temporarily holding the foil piece fast. This device is above all purposeful when a part of the foil piece is not already permanently affixed before forming. While the foil piece is being temporarily held fast, it can be securely formed without slipping out of place due of the effect of the various devices. The unformed foil pieces can also be fed individually to the apparatus.

Advantageously, the apparatus is fed a large piece of plane foil and is provided with a device for cutting out sheet-like foil pieces from the plane foil. The plane foil can be fed for this purpose in the form of a tape, in which there is a plurality of sections corresponding to foil pieces, which can be cut out of the tape in the apparatus.

The various devices of the apparatus can be installed in a single processing station or in a plurality of processing stations. In an advantageous embodiment, the device for separating a foil piece, the device for applying the foil piece, the device for holding the foil piece fast, the device for forming the section overlapping the wall opening and the device for forming the section projecting out of the opening are arranged at one processing station, while the device for affixing the foil piece formed into a rivet-shaped protective covering is arranged at another processing device. The processing station for affixing is arranged downstream of the first mentioned processing station in relation to the processing stages.

The device for separating a foil piece can comprise a die plate with a recess corresponding to the outer contour of the uncut foil piece and a blanking punch corresponding to the outer contour of the foil piece. The blanking punch can slide from one position outside of the die plate to a position inside the recess of the die plate.

In a further embodiment, the application device comprises a device for transporting the foil piece, which is advantageously formed by the blanking punch. The blanking punch can be guided through the recess in the die plate to the first wall area. The circumferential wall of the recess acts then as a guiding surface for the foil piece while being transported to the wall.

The device for forming the section overlapping the opening of the wall can also comprise a supporting plate with a recess whose contour corresponds at least approximately to the contour of the opening of the wall and into which recess a drawing punch can be guided, whose outer contour corresponds approximately to the contour of the recess. Due to the essentially corresponding contours, the section of the foil piece which has been formed into the opening receives a shape corresponding to the opening and can be laid against the edge.

The diameter of the drawing punch can be slightly narrower than the diameter of the opening of the wall and the recess in the supporting plate. A deviation in the diameter size can be practicable in order to leave sufficient room between the edge of the wall opening and the drawing punch for the formed foil piece. It can also be advantageous not to make the diameter of the drawing punch narrower than the diameter of the wall opening, for example, when the wall is not rigid.

In an advantageous embodiment, the drawing punch has a smaller diameter at its front end to aid the formation of the plane, overlapping section into the opening.

The front end of the drawing punch can be made to match an opening arranged in the foil piece. This also aids the forming of the plane, overlapping section of the foil piece into the wall opening. This measure is particularly advantageous when forming is done cold.

The device for holding the foil piece fast can be formed by the blanking punch, which is guided to the first wall area, and by the supporting plate. The device for forming the section of the foil piece projecting out of the wall opening comprises a bordering punch, which can be slid into an opening of the above mentioned section of the foil piece and whose outer contour is so shaped that the above mentioned projecting section is expanded and formed towards the second wall area when the bordering punch slides into position.

It is useful to place the bordering punch on the drawing punch so that, when the drawing punch slides, the bordering punch moves therewith. This aids forming because the section of the foil piece projecting out of the opening is transferred from the drawing punch to the bordering punch without interruption.

The outer contour of the bordering punch can correspond at least approximately over a longitudinal area to the contour of the wall opening. Advantageously, the bordering punch has a longitudinal area, beginning at its front end and extending essentially axially, and a ring surface, adjoining outwards thereto, with essentially radial direction components. The longitudinal area extending essentially axially penetrates into the inside of the essentially tube-shaped section of the foil piece which projects out of the opening during the sliding movement of the bordering punch, and guides the foil piece to the ring surface. The ring surface presses the projecting section against the wall area.

The bordering punch ban have an approximately constant diameter in a central longitudinal area, which diameter is slightly narrower than the diameter of the wall opening. A front longitudinal area with a diameter tapering towards the front end of the bordering punch advantageously adjoins the central longitudinal area of the bordering punch. The transfer by the bordering punch of the tube shaped section projecting out of the wall opening is simplified.

The area of the bordering punch, at which the essentially axially extending longitudinal area goes over to the ring surface with radial direction components, is also advantageously formed by a circumferential surface which forms a ring-shaped groove recess in the ring surface. The forming of the section of the foil piece which projects out of the wall opening to the second wall area is thus simplified.

The supporting plate is formed from a plurality of sub-plates which are movable away from the center of the recess in radial direction of the recess of the supporting plate. Space is thus simply made for the bordering punch to press the foil piece against the second wall area. The blanking punch is formed as a tube, in whose hollow area the drawing punch is freely suspended.

BRIEF DESCRIPTION OF THE DRAWINGS

These and further objects, features and advantages of the present invention will become more readily apparent from the following detailed description thereof when taken in conjunction with the accompanying drawings wherein:

FIG. 1 is a schematic drawing of a process carried out by the apparatus for the production and application of a rivet-shaped protective covering;

FIG. 3 is an apparatus with a first and a second processing station for the production and application of a rivet-shaped protective covering.

DETAILED DESCRIPTION OF THE DRAWINGS

Figure 2A:
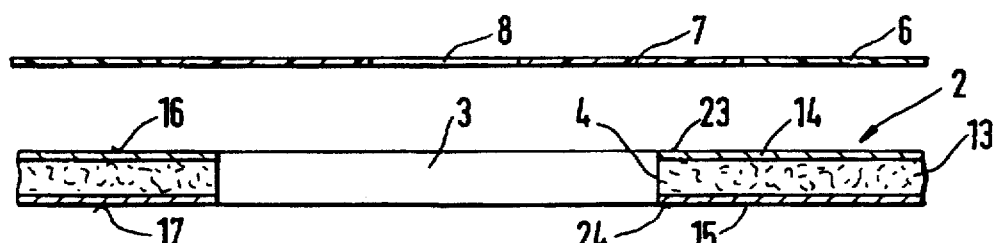
FIGS. 2a to 2e show the individual production stages of the process shown in FIG. 1.

In the process shown in FIG. 1, a tape 1 of coated cardboard is unwound from a roll (not shown) in a known way and fed to a first processing station 5 in the direction of the arrow A. The tape 1 comprises a plurality of sections, arranged one behind the other (represented by dot-dash lines), each of which sections correspond to a wall 2 for a container. Each wall 2 of the tape 1 is provided with an opening 3, whose edge 4 is to be provided with a protective covering 12. After the protective covering 12 has been applied as described below, the tape 1 is wound up onto a roll (not shown) in a known manner which is fed to a machine for producing cans.

For the production of the cans, the walls 2 with the protective covering 12 will be punched out along the dot-dash line and further processed into lids for the cans. This process is not further described here as it forms no part of the present invention.

The above mentioned processing station 5 is fed a tape-shaped foil 6 from a roll (not shown), which foil 6 is preferably polyethylene. The foil 6 comprises a plurality of sections which each correspond to a foil piece 7 and which can be cut out from the tape-shaped foil 6 along the dot-dash line. Each foil piece 7 of the tape-shaped foil 6 is provided with an opening 8 whose contour corresponds to the contour of the opening 3 of the wall 2. The opening 8 has, however, a smaller diameter than the wall opening 3. At the processing station 5, each of the sections of the tape-shaped foil 6 which correspond to a foil piece 7 are fed to one section, corresponding to the wall 2, of the cardboard tape 1. The sections of the foil 6 and the tape 1 are positioned facing each other in such a way that an opening 8 aligns with and faces an opening 3 at a distance. The section of the foil 6 so positioned is punched out as foil piece 7 and lies against the wall 2. As the outer circumference of the foil piece 7 is somewhat larger and the diameter of the opening 8 of the foil piece 7 somewhat smaller than the opening 3 of the wall 2, the foil piece 7 forms a ring-shaped section 10 overlapping the opening 3 and a border section 9 projecting over the edge area of the wall 2.

At the processing station 5, the cut out foil piece 7 is formed in such a way that, after it has been applied to the wall 2, the opening 3 of the wall 2 is covered in rivet-like fashion. The wall 2, provided with the rivet-shaped foil piece 7, is transported further, together with the tape 1, to a processing station 11. There the rivet-shaped foil piece 7 is affixed permanently in a leakproof way to the wall 2, so that a rivet-shaped protective covering 12 is formed. The individual production stages are described below with the aid of FIGS. 2a to 2e. The production and application of the rivet-shaped protective covering 12 can be done by an apparatus whose construction and function is described in FIGS. 3 and 4a to 4d.

As can be seen from FIGS. 2a to 2e, the wall 2 to which the protective covering 12 will be applied comprises a carrier layer 13 of cardboard and two protective layers 14, 15 which are preferably polyethylene. The protective layer 14 forms the surface of a first wall area 16 bordering the edge 4, and the protective layer 15 forms the surface of a wall area 17 bordering the edge 4. The edge 4 of the opening 3 of the wall 2 is not covered by a protective layer.

In the production stage shown in FIG. 2a, the fed foil 6 is brought into the above-discussed position, namely the openings 3 and 8 being aligned. Opposite the foil 6, a foil piece 7 lies at a distance and corresponds to the section of the foil 6 of the first wall area 16.

Figure 2B:
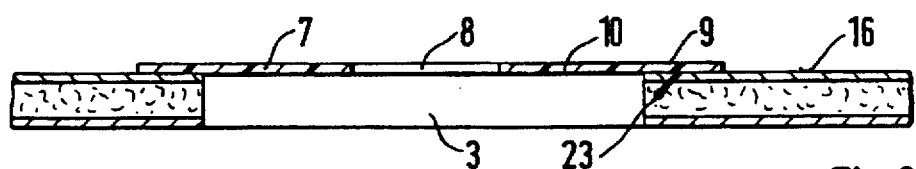

In the production stage shown in FIG. 2b, the foil piece 7 of the foil 6 is cut therefrom and applied to the first wall area 16 of the wall 2, so that it covers the opening 3 and the thereon bordering edge area 23 of the wall 2. The edge section 9 covering the edge area 23 and the section 10 overlapping the opening 3 are thereby formed as already mentioned above. The foil piece 7 is now pressed against the first wall area 16 of the wall 2.

Figure 2C:
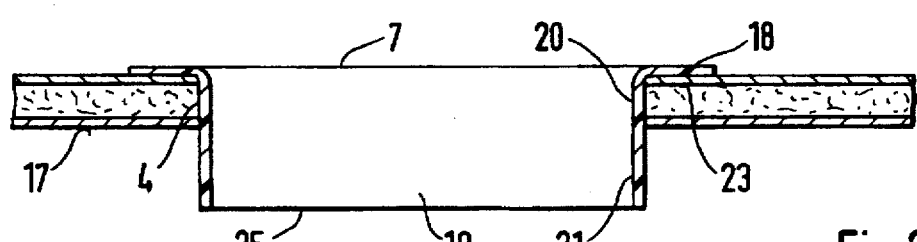

In a subsequent production stage, shown in FIG. 2c, the overlapping section 10 is formed through the opening 3 so that a section 18 remaining at the first wall area of the wall 2 and corresponding to the edge section 9 is formed, and a formed, tube-shaped section 19 is also formed. The tube-shaped section 19 comprises a section 20 covering the edge 4, and a section 21 projecting out of the opening 3. The section 21 terminates at the front side with an opening 25.

Figure 2D:
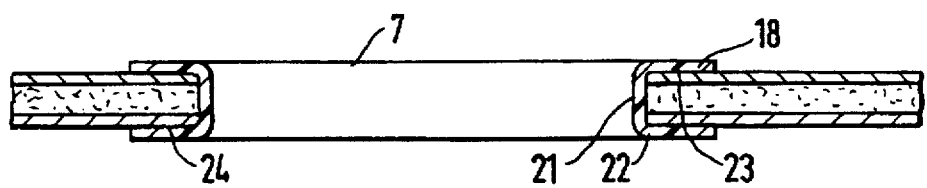

In a next production stage, shown in FIG. 2d, the projecting section 21 is formed in the direction towards the second wall area 17 of the wall 2 so that a further plane section 22 is formed in the foil piece 7. The foil piece 7 now has a rivet-shaped form and lies, unaffixed, in the area of the opening 3.

Figure 2E:
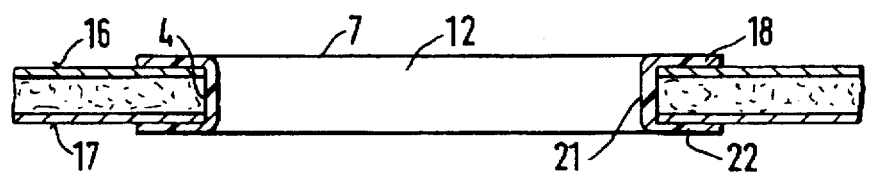

In the production stage shown in FIG. 2e, the rivet-shaped foil piece 7 is affixed to both wall areas 16, 17 and additionally to the edge 4 by heat sealing. The foil piece 7 now forms the rivet-shaped protective covering 12.

The above-described production stages shown in FIGS. 2a to 2d are executed in the first processing station 5, and the production stage described in FIG. 2e is executed in the second processing station 11 (FIG. 3). The apparatus shown in FIG. 3 comprises both the first processing station 5 and the second processing station 11.

The processing station 5 comprises a device 30 for separating the foil piece 7, a device 40 for applying the cut out foil piece 7, a device 50 for forming the overlapping section 10 of the foil piece 7, a device 60 for forming the section 21 projecting out of the opening 3 and a device 70 for holding fast the cut out foil piece 7. The processing station 5 will now be described with reference to FIGS. 4a to 4d.

The second processing station 11 comprises a device 80 for affixing the rivet-shaped foil piece 7 to the wall 2. The device 80 is an ultrasonic welding device and comprises a sonotrode 81 as well as an anvil 82 cooperating therewith. The sonotrode 81 includes an insert 83 whose contour corresponds to the contour of the opening 3 and whose diameter is somewhat smaller than the diameter of the opening 3. The insert 83 projects into the opening 3 and fills it almost completely.

As can be seen in FIG. 3, the processing station 5 is fed a wall 2 whose opening 3 is to be covered by a foil piece 7 from a fed foil 6. The foil piece 7 is formed into the desired rivet shape at this processing station 5 as described below with reference to FIGS. 4a to 4d.

At the processing station 11, the rivet-shaped formed foil piece 7 is affixed to the wall 2 by the ultrasonic welding device. The necessary heat for welding is generated by the sonotrode 81 and the anvil 82. The sonotrode 81 lies on the first wall area 16 and the anvil 82 on the second wall area 17 against the rivet-shaped formed foil piece 7. The insert 82 prevents the heated material of the foil piece 7 from running inside the opening 3.

FIGS. 4a through 4d show the components used to form the foil piece 7 in various working positions. The construction and arrangement of the components will be described below with specific reference to FIG. 4a, while the function of the components will be described with reference to FIGS. 4b to 4d.

The separating device 30 includes a die plate 31 which, in turn, comprises a recess 32 whose contour corresponds to the contour of the uncut foil piece 7. The recess 32 is guided through the die plate 31. Under the die plate 31, the wall 2 designated to receive a protective covering 12 is positioned in such a way that the opening 3 is aligned exactly with the recess 32. The cross-sectional area of the recess 32 is larger than the cross-sectional area of the opening 3, so that the edge area 23 of the wall 2 lies uncovered. The device 30 further has a blanking punch 33 whose outer contour corresponds to the contour of the recess 32. The blanking punch 33 can be guided into the recess 32 to the wall area 16 of the wall 2. The blanking punch 33 has a tube-shaped form and includes a hollow area 34.

The device 40 for applying the cut out foil piece 7 comprises a device 41 for transporting the foil piece 7 which is formed by the blanking punch 33. The blanking punch 33 can be guided through the recess 32 to the first wall area 16 of the wall 2 and thus transport the cut-out foil piece 7. The circumferential wall of the recess 32 can serve as a guiding surface for the foil piece 7 while it is being transported to the wall 2.

Figure 4A:
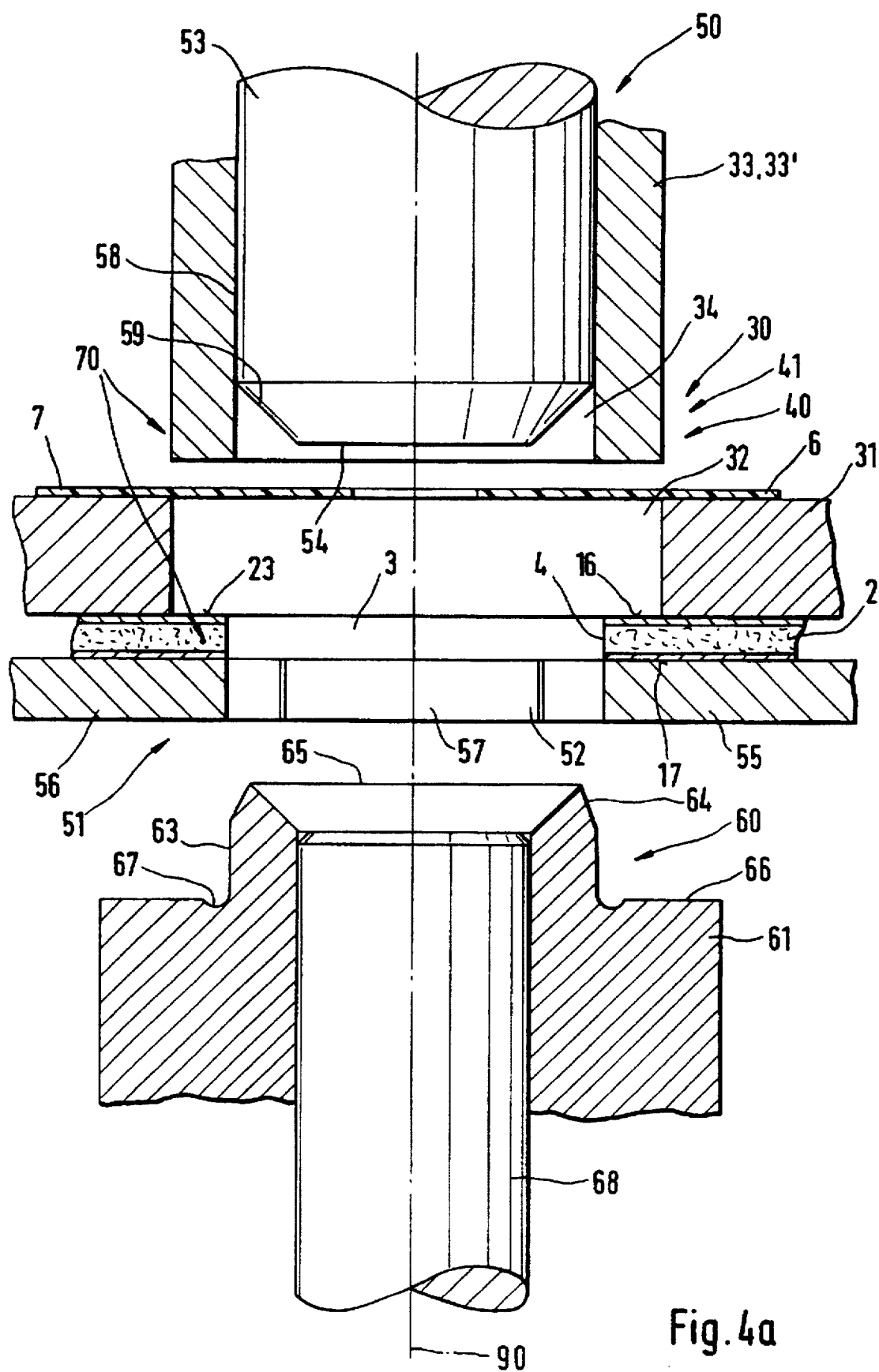
FIGS. 4a to 4d show the production stages of the first processing station shown in FIG. 3 but in an enlarged view.
Figure 4B:
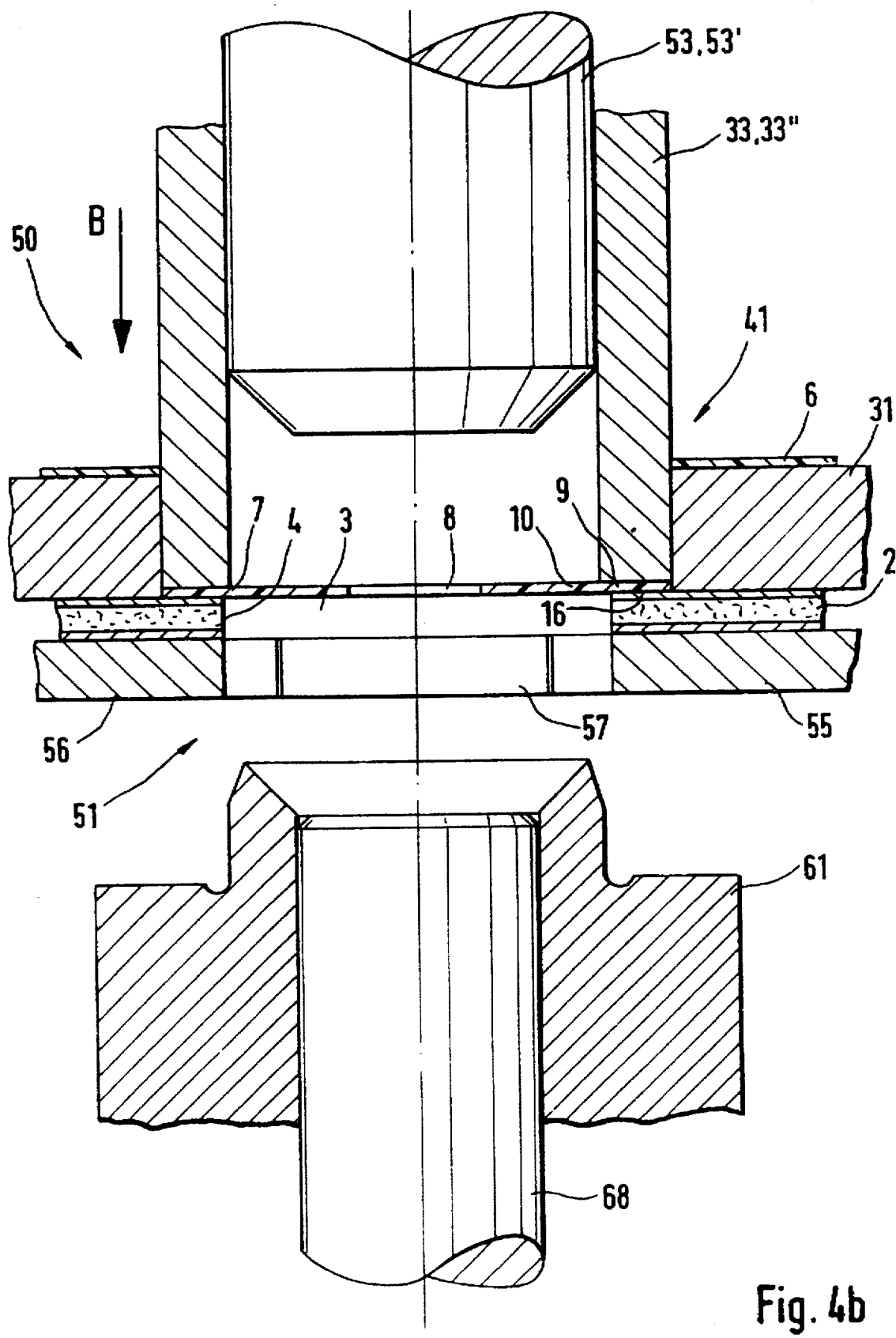
Figure 4C:
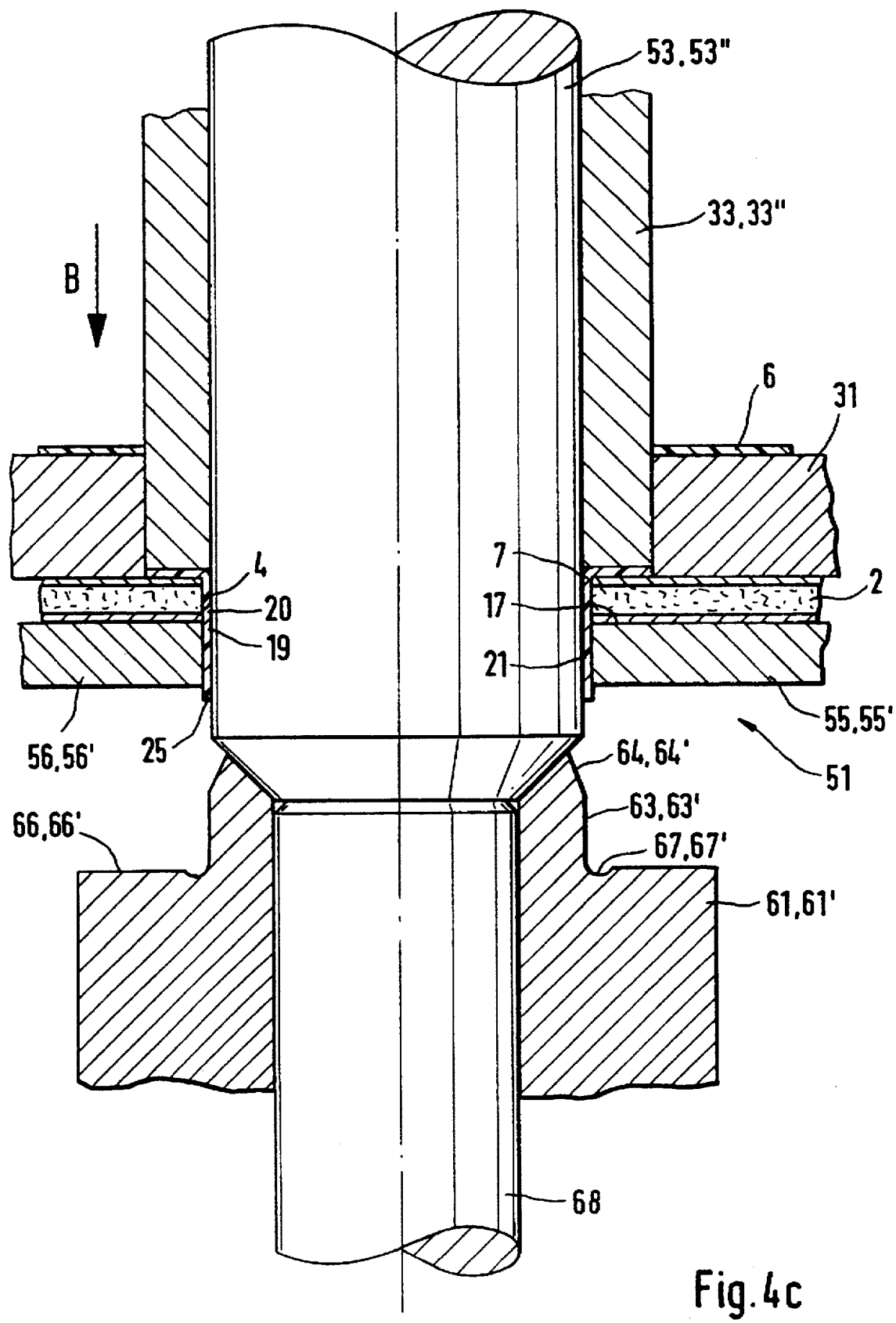

The device 50 for forming the section 10, as also seen in FIG. 4b, overlapping the opening 3 of the wall 2 comprises a supporting plate 51 with a recess 52 as well as a drawing punch 53. The drawing punch 53 is movable in the hollow area 34 formed inside the tube-shaped blanking punch 33 and can be guided into the recess 52 of the supporting plate 51. The contour of the recess 52 corresponds at least approximately to the contour of the opening 3 of the wall 2. The contour of the drawing punch 53 corresponds in diameter at least approximately to the contour of the recess 52. The cross-sectional area of the drawing punch 53 is slightly smaller than the cross-sectional area of the opening 3 of the wall 2 and the recess 52 of the supporting plate 51. The section 19 of the foil piece 7 formed into the opening 3, as seen also in FIG. 4c, is left sufficient space between the edge 4 of the opening 3 of the wall 2 and the drawing punch 53.

The circumferential wall of the drawing punch 53 extends over a central longitudinal area 58 parallel to the axis 90 of the drawing punch 53. The cross-sectional area of the drawing punch 53 is narrower at its front end 54 than at its central longitudinal area 58. As a result, the circumferential wall extends with an incline towards the axis 90 in the front longitudinal area 59 of the drawing punch 53. This construction of the front longitudinal area 59 and the front end 54 of the drawing punch 53 is adapted to the foil piece 7 comprising an opening 8, and facilitates forming into the opening 3 of the wall 2.

The supporting plate 51 is divided into four sub-plates, which can be moved away from the axis 90. Of the four sub-plates of the supporting plate 51, only sub-plates 55, 56, 57 are shown. The device 70 for holding the foil piece 7 fast or secure is formed by the blanking punch 33, which is guided to the first wall area 16 of the wall 2, and the supporting plate 51.

The device 60 for forming the section 21 of the foil piece 7 which projects out of the opening 3 of the wall 2 comprises a bordering punch 61 which can be slid into the opening 3 of the wall 2 and cooperates with the drawing punch 53. The bordering punch 61 can be applied to the front end 65 of the drawing punch 53 so that when the bordering punch 61 slides into the opening 3, the drawing punch 53 moves therewith. The bordering punch 61 is movable along a guiding mandrel 68 in order to enable it to execute the sliding movement.

The outer contour of the bordering punch 61 corresponds at least approximately over a central longitudinal area 63 and a front longitudinal area 64 to the opening 3 of the wall 2. The outer circumferential wall of the bordering punch 61 extends at the front longitudinal area 64 and the central longitudinal area 63 essentially parallel to the axis 90. The circumferential wall extends, however, with a slight incline towards the axis 90 in the direction towards the front end 65 of the bordering punch 61. In the other direction, a ring surface 66 is joined to the central longitudinal area 63 comprising essentially radial direction components.

In the central longitudinal area 63, the diameter is at least approximately constant and slightly narrower than the diameter of the opening 3 of the wall 2. The cross-sectional area tapers continuously in the direction to the front end 65 due to the inclined course of the circumferential wall in the front longitudinal area 64, and is narrower than the diameter of the central longitudinal area 63.

The bordering punch 61 comprises a circumferential surface 67 in the area in which the central longitudinal area 63 graduates into the ring area 66 with radial direction components. The circumferential surface 67 forms a ring-shaped groove in the ring area 66.

The blanking punch 33 is located at a position 33' in FIG. 4a outside of the recess 32 of the die plate 31. The foil 6 lies on the die plate 31. The wall 2 lies on the supporting plate 51 and is supported thereby. The wall 2 and the foil 6 take up the position in FIG. 2a described above.

The blanking punch 33 is now moved in the direction of arrow B, as seen also in FIG. 4b, when the foil piece 7 is to be cut out of the foil 6, until the blanking punch 33 has reached position 33'. With the movement of the blanking punch 33, the foil piece 7 is cut out from the foil 6 as soon as the blanking punch 33 passes the upper edge of the recess 32 of the die plate 31. The blanking punch 33 transports the cut out foil piece 7 during this movement inside the recess 32 up to the wall area 16 of the wall 2, so that the foil piece 7 rests against the first wall area 16 of the wall 2 in the edge area 23. When the foil piece 7 is being transported to the wall 2, the inner wall of the recess 32 serves as a guiding surface for the foil piece 7.

The blanking punch 33 remains in the position 33", and exercises a light pressure in the direction of the arrow B. The foil piece 7 takes up the position shown in FIG. 2b and is temporarily held fast by the nipping effect of the blanking punch 33 with the supporting plate 51, on which the blanking punch 33 is supported by way of the wall 2. The drawing punch 53 remains in the position 53' shown in FIG. 4b during the above-described processing stages.

In the processing stage shown in FIG. 4c, the drawing punch 53 is slid in the direction of the arrow B into the position 53". The section 10 of the foil piece 7, as also seen in FIG. 4b, overlapping the opening 3 is hereby formed into the opening 3 of the wall 2. The foil piece 7 attains the shape shown in FIG. 2c, that is, a tube-shaped section 19 is formed, of which a section 20 covers the edge 4 of the opening 3 and a section 21 projects out of the opening 3 of the wall 2. The section 21 projecting out of the opening 3 of the wall 2 lies hereby against the inner wall of the recess present in the supporting plate 51 as shown in FIG. 4a.

As a result of the movement of the drawing punch 53 into the position 53", the opening 8 of the foil piece 7 shown in FIG. 4b is expanded in such a way that the formed, tube-shaped section 19 of the foil piece 7 forms a front side opening 25 as seen in FIG. 2c, whose diameter corresponds at least approximately to the diameter of the drawing punch 53.

In the working position shown in FIG. 4c, the sub-plates 55, 56 take up the positions 55', 56', whereas the sub-plates 57 (not shown in FIG. 4c) also take up relevant positions. The bordering punch 61, including its front longitudinal area 64, the central longitudinal area 63, the ring area 66 and the circumferential surface 67 take up the positions 61', 64', 63', 66', 67' shown in FIG. 4c.

Figure 4D:
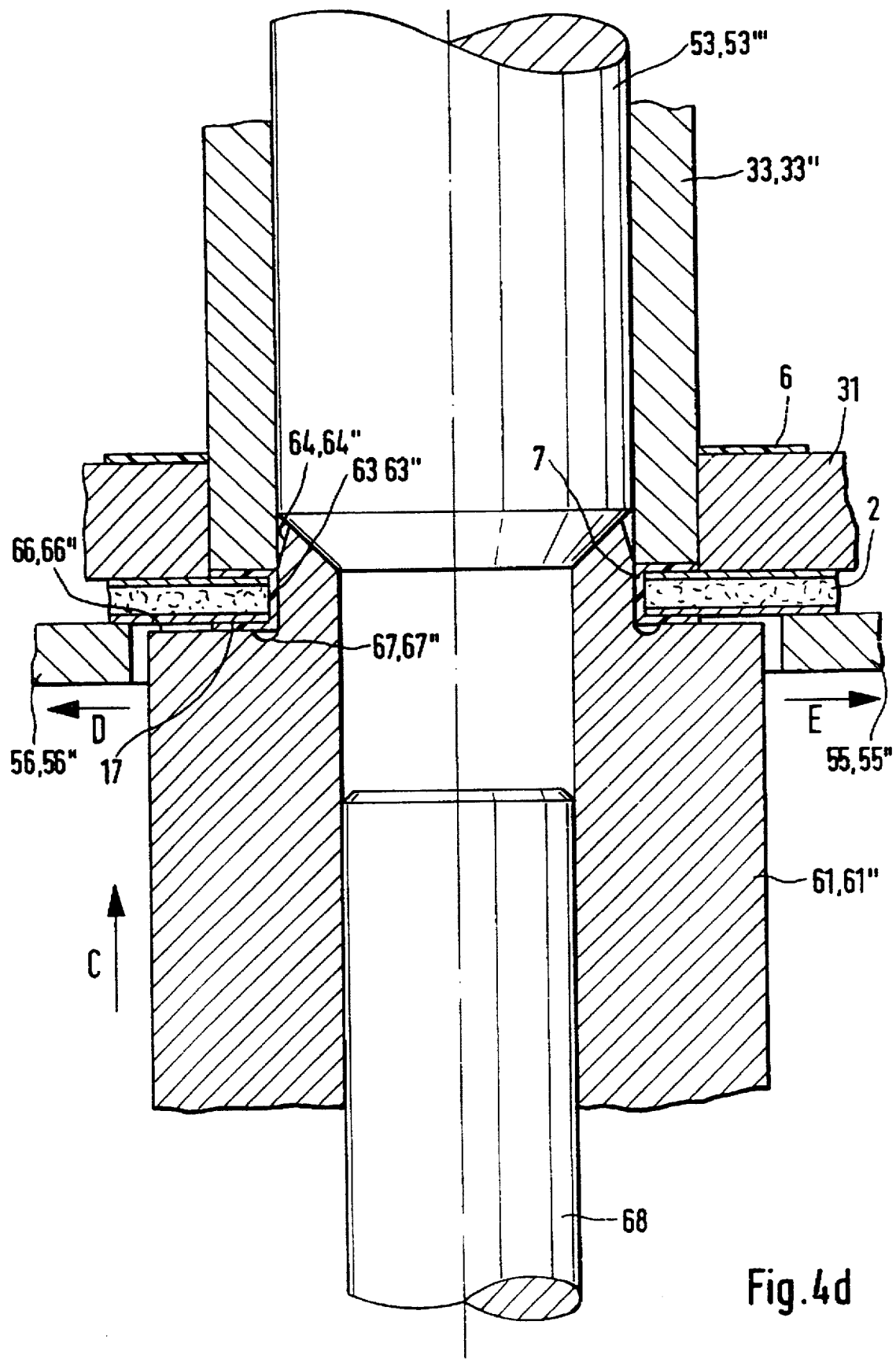

In the processing stage shown in FIG. 4d, the section 21 previously seen in FIG. 4c projecting out of the opening 3 of the foil piece 7 is formed towards the second wall area 17 of the wall 2. The bordering punch 61 is slid in the direction of the arrow C in the position 61". During the sliding movement of the bordering punch 61, the drawing punch 53 moves with it and is guided over into the position 53'". The sub-plates 55, 56 of the supporting plate 51 are moved radially outwards in the direction of the arrows E, D into the positions 55" and 56", so that the bordering punch 61 is not hindered in its sliding movement. The sub-plates 57 (not shown) are moved radially outwards in the same way as the sub-plates 55, 56.

During the sliding movement of the bordering punch 61, its front longitudinal area 64, which has a relatively narrow cross-section area, moves through the opening 25 into the inside of the tube-shaped section 19 seen in FIG. 4c. With further sliding of the bordering punch 61, its central longitudinal area 63 also moves into the inside of the tube-shaped section 19. Finally, with further sliding, the circumferential area 67 reaches the front edge of the tube-shaped section 19 bordering the opening 25. There the front edge of the tube-shaped section 19 is formed radially outwards and with the aid of the essentially radially extending ring surface 66 pressed against the second wall area 17 of the wall 2.

The sliding movement of the bordering punch 61 in the direction of the arrow C in FIG. 4d now comes to an end. The bordering punch 61, the front longitudinal area 64, the central longitudinal area 63, the circumferential area 67 and the ring area 66 take up the positions 61", 64", 63", 67" and 66". The foil piece 7 now has the rivet-shaped form as shown in FIG. 2d.

The blanking punch 33, the drawing punch 53 and the bordering punch 61 thereafter withdraw, thus releasing the wall 2 with the rivet-shaped foil piece 7 from the processing station 5 and leaving it free for transportation to the processing station 11. At the processing station 11, the rivet-shaped foil piece 7, as described above, is affixed to the wall 2 by heat sealing.

Although the invention has been described and illustrated in detail, it is to be clearly understood that the same is byway of illustration and example, and is not to be taken by way of limitation. The spirit and scope of the present invention are to be limited only by the terms of the appended claims.

What is claimed is:

1. An apparatus for producing and applying a protective covering to a cut edge of an opening of a container wall, comprising:

a device for cutting out a sheet-like foil piece from a tape-like foil which comprises a die plate with a recess corresponding to the outer contour of the uncut foil piece, and a blanking punch corresponding to the outer contour of the foil piece and slidable from a position outside of the die plate to a position inside the recess of the die plate;

a device for applying the foil piece to a first wall area bordering the cut edge of the opening, said foil piece overlapping said opening;

a device for forming a section of said overlapping foil piece through the opening;

a device for forming a section of the formed foil piece which projects out of the opening at a second wall area bordering the cut edge and opposite the first wall opening, to a rivet-shaped protective covering which completely covers the cut edge; and a device for permanently affixing the foil piece formed to said rivet-shaped protective covering.

2. The apparatus according to claim 1, further comprising a device for temporarily holding the foil piece fast.

3. The apparatus according to claim 1, wherein the device for cutting out the foil piece, the device for applying the foil piece, the device for temporarily holding fast the foil piece, the device for forming the section overlapping the opening of the wall and the device for forming the section projecting out of the opening of the wall are operatively arranged at a processing station, and the device for affixing the foil piece formed to a rivet-shaped protective covering is operatively arranged at another processing station.

4. The apparatus according to claim 1, wherein the device for cutting out the foil piece, the device for applying the foil piece, the device for temporarily holding fast the foil piece, the device for forming the section overlapping the opening of the wall and the device for forming the section projecting out of the opening of the wall are operatively arranged at a processing station, and the device for affixing the foil piece formed to a rivet-shaped protective covering is operatively arranged at another processing station.

5. The apparatus according to claim 1, wherein the application device comprises a device for transporting the foil piece.

6. The apparatus according to claim 5, wherein the transporting device is formed by the blanking punch which is guidable through the recess of the die plate to the first wall area.

7. The apparatus according to claim 1, wherein the device for forming the section overlapping the opening of the wall comprises a supporting plate with a recess, the contour of said recess at least approximately corresponding to the contour of the opening of the wall and into which recess a drawing punch can be guided, the outer contour of the drawing punch corresponding at least approximately to the contour of the recess.

8. The apparatus according to claim 7, wherein the cross-sectional area of the drawing punch is narrower than the diameter of the opening of the wall and the recess of the supporting plate.

9. The apparatus according to claim 7, wherein the drawing punch has a narrowed diameter at a front end thereof.

10. The apparatus according to claim 9, wherein the cross-sectional area of the drawing punch is narrower than the diameter of the opening of the wall and the recess of the supporting plate.

11. The apparatus according to claim 9, wherein the front end of the drawing punch is configured to correspond to an opening arranged in the foil piece.

12. The apparatus according to claim 7, wherein the blanking punch, guided to the first wall area, and the supporting plate comprise the device for holding fast the foil piece.

13. The apparatus according to claim 1, wherein the device for forming the section of the foil piece projecting out of the opening of the wall comprises a bordering punch slidable into an opening of the section of the foil piece and having an outer contour configured so that the section is expanded when the bordering punch is moved, and is then formed to the second wall area.

14. The apparatus according to claim 13, wherein the bordering punch is placeable on the drawing punch so that, when the bordering punch moves, the drawing punch moves therewith.

15. The apparatus according to claim 13, wherein the outer contour of the bordering punch corresponds, at least approximately, over a longitudinal area thereof to the contour of the opening of the wall.

16. The apparatus according to claim 13, wherein the bordering punch comprises a longitudinal area, beginning at a front end thereof and extending substantially axially, and a ring area joined thereto with substantially radial direction components.

17. The apparatus according to claim 13, wherein the bordering punch has in at least a central longitudinal area an approximately constant diameter which is slightly narrower than the diameter of the opening of the wall.

18. The apparatus according to claim 17, wherein a front longitudinal area of the bordering punch with a cross-sectional area tapering towards the front end of the bordering punch adjoins the central longitudinal area of the bordering punch.

19. The apparatus according to claim 16, wherein the ring area forms a ring-like grooved circumferential area in an area which graduates into the substantially axially extending longitudinal area.

20. The apparatus according to claim 7, wherein the supporting plate is formed by a plurality of sub-plates which are configured to be movable in a radial direction of the recess of the supporting plate from a center of the recess.

21. The apparatus according to claim 1, wherein the blanking punch comprises a tube having a hollow portion in which a drawing punch is freely suspended.

* * * * *